United States Patent
Maiman et al.

(10) Patent No.: US 12,028,325 B2
(45) Date of Patent: Jul. 2, 2024

(54) ACCOUNT AUTHENTICATION EXCLUDING MERCHANTS BASED ON MERCHANT LOGOS

(71) Applicant: Capital One Services, LLC, McLean, VA (US)

(72) Inventors: Tyler Maiman, Melville, NY (US); Viraj Chaudhary, Katy, TX (US); Joshua Edwards, Philadelphia, PA (US); Jenny Melendez, Falls Church, VA (US); Samuel Rapowitz, Roswell, GA (US); Daniel E. Miller, Astoria, NY (US); David Septimus, New York, NY (US)

(73) Assignee: Capital One Services, LLC, McLean, VA (US)

( * ) Notice: Subject to any disclaimer, the term of this patent is extended or adjusted under 35 U.S.C. 154(b) by 288 days.

(21) Appl. No.: 17/461,025

(22) Filed: Aug. 30, 2021

(65) Prior Publication Data
US 2023/0063562 A1 Mar. 2, 2023

(51) Int. Cl.
*G06F 7/04* (2006.01)
*G06F 15/16* (2006.01)
(Continued)

(52) U.S. Cl.
CPC ............ *H04L 63/08* (2013.01); *G06F 18/22* (2023.01); *G06F 40/295* (2020.01); *G06N 5/04* (2013.01);
(Continued)

(58) Field of Classification Search
CPC ... G06Q 30/0201; H04L 63/08; H04L 63/102; G06N 5/04; G06F 40/295; G10L 25/51; G06K 9/6215
(Continued)

(56) References Cited

U.S. PATENT DOCUMENTS

| | | | |
|---|---|---|---|
| 2013/0073859 A1* | 3/2013 | Carlson | H04L 9/3247 713/176 |
| 2016/0358178 A1* | 12/2016 | Ghosh | H04L 9/3271 |

(Continued)

OTHER PUBLICATIONS

Jan. 29, 2019, Carson, "8 famous logos that look unbelievably similar," <<https://www.creativebloq.com/features/8-famous-logos-that-look-unbelievably-similar>>, 18 pages.
(Continued)

*Primary Examiner* — Brandon Hoffman
*Assistant Examiner* — Samuel Ambaye
(74) *Attorney, Agent, or Firm* — Banner & Witcoff, Ltd.

(57) ABSTRACT

Methods, systems, and apparatuses are described herein for improving computer authentication processes through the exclusion of certain merchants that may cause confusion. Indications of a plurality of different merchants, including merchant logos may be received. The indications may be processed to identify at least one similarity between a first merchant and a second merchant. A request for access to an account associated with a user and transaction data corresponding to the account may be received. Based on the similarity between the first merchant and the second merchant, at least one transaction corresponding to the first merchant may be removed to generate processed transaction record. An authentication question may be generated and a candidate response to the authentication question may be received. Based on the candidate response, access to the account may be provided.

20 Claims, 5 Drawing Sheets

(51) Int. Cl.
*G06F 18/22* (2023.01)
*G06F 40/295* (2020.01)
*G06N 5/04* (2023.01)
*G06Q 30/0201* (2023.01)
*G10L 25/51* (2013.01)
*H04L 9/40* (2022.01)
*H04L 29/06* (2006.01)

(52) U.S. Cl.
CPC .......... *G06Q 30/0201* (2013.01); *G10L 25/51* (2013.01); *H04L 63/102* (2013.01)

(58) Field of Classification Search
USPC ........................................................... 726/7
See application file for complete search history.

(56) References Cited

U.S. PATENT DOCUMENTS

2020/0142889 A1\* 5/2020 Yadav ................ G06F 16/9035
2020/0357390 A1\* 11/2020 Bromand ................ G10L 13/08

OTHER PUBLICATIONS

Aug. 10, 2020, Cass, "Why Do Everyone's Logo Fonts Look the Same?" <<https://justcreative.com/why-do-everyones-logo-fonts-look-the-same/>>, 23 pages.
Aug. 8, 2018, Nguyen, "Nordstrom vs. Nordstrom's: Why do we confuse company names?" <<https://www.marketplace.org/2019/08/08/nordstrom-vs-nordstroms-why-do-we-confuse-company-names/>>, 13 pages.

\* cited by examiner

ACCOUNT AUTHENTICATION EXCLUDING MERCHANTS BASED ON MERCHANT LOGOS

FIELD OF USE

Aspects of the disclosure relate generally to account security. More specifically, aspects of the disclosure may provide for improvements in the method in which authentication questions are generated through the use of transaction and merchant information.

BACKGROUND

As part of determining whether to grant a user access to content (e.g., as part of determining whether to provide a caller access to a telephone system that provides banking information), a user of the user device might be prompted with one or more authentication questions. Such questions might relate to, for example, a password of the user, a personal identification number (PIN) of the user, or the like. Those questions might additionally and/or alternatively be generated based on personal information of the user. For example, when setting up an account, a user might provide a variety of answers to predetermined questions (e.g., "Where was your father born?," "Who was your best friend in high school?"), and those questions might be presented to the user as part of an authentication process. As another example, a commercially-available database of personal information might be queried to determine personal information for a user (e.g., their birthdate, birth state, etc.), and that information might be used to generate an authentication question (e.g., "Where were you born, and in what year?").

As part of authenticating a computing device, information about financial transactions conducted by a user of that computing device might be used to generate authentication questions as well. For example, a user might be asked questions about one or more transactions conducted by the user in the past (e.g., "Where did you get coffee yesterday?," "How much did you spend on coffee yesterday?," or the like). Such questions might prompt a user to provide a textual answer (e.g., by inputting an answer in a text field), to select one of a plurality of answers (e.g., select a single correct answer from a plurality of candidate answers), or the like. In some instances, the user might be asked about transactions that they did not conduct. For example, a computing device might generate a fake transaction (that is, a fake transaction that was never conducted by a user), and ask a user to confirm whether or not they conducted that transaction. Authentication questions can be significantly more useful when they can be based on either real transactions or fake transactions: after all, if every question related to a real transaction, a nefarious user could use personal knowledge of a legitimate user to guess the answer, and/or the nefarious user might be able to glean personal information about the legitimate user.

One challenge in providing authentication questions based on financial transactions conducted by a user is to achieve a high level of security while minimizing potential authentication failure due to similarities in merchant names. For example, a first merchant may have a logo similar to that of a second merchant such that, a user has conducted some transactions with the first merchant, the user might nonetheless have trouble identifying whether those transactions were conducted with the first merchant or the second merchant. In addition to logo-related confusion, some merchant names may have phonetic or spelling similarities that may cause users to become confused. For example, certain users, such as non-native speakers or auditory visual leaners, may be more readily confused by merchant names or logos (especially when merchant names sound similar when spoken in foreign languages), thereby making those users more susceptible to inadvertent authentication failure.

Aspects described herein may address these and other problems, and generally improve the safety of financial accounts and computer transaction systems by excluding merchants based on visual elements of their logos or phonetic elements of their names.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for improvements in the manner in which authentication questions are used to control access to accounts. The improvements described herein relate to the excluding certain merchants from a list of merchants to be presented in an authentication question. These merchants may bear some similarities to one or more true merchants on a user's transaction history. In turn, excluding such merchants from authentication questions may promote account accessibility to user with intellectual or physical disabilities, and or language barriers, and better protect their accounts from unauthorized access. As will be described in greater detail below, this process is effectuated by identifying similarities based on, for example, visual elements of a merchant logos, words, typefaces or colors in the presentation of the merchant logos/names, and/or phonetics or spelling in the merchant names, which may allow for minimizing confusions and increasing account accessibilities in the user community.

More particularly, and as will be described further herein, a computing device may receive, from a merchants database, indications of a plurality of different merchants. The computing device may process the indications of the plurality of different merchants to identify at least one similarity between a first merchant and a second merchant. The similarity may relate to a first name or a first logo of the first merchant and a second name and a second logo of the second merchant. The computing device may receive an indication of a request, from a user device, for access to an account. The computing device may receive, from a transactions database, transactions data corresponding to the account. The transactions data may indicate one or more transactions conducted by a user. The computing device may generate processed transactions data by removing, from the transactions data and based on the at least one similarity between the first merchant and the second merchant, at least one transaction corresponding to the first merchant. The computing device may generate, based on the processed transactions data, an authentication question. The computing device may receive a candidate response to the authentication question. The computing device may provide, based on the candidate response, the user device access to the account.

In some embodiments, the computing device may process the plurality of different merchants to identify the at least one similarity between the first merchant and the second merchant by receiving first natural language processing output by processing the first name using a natural language processing algorithm, receiving second natural language processing output by processing the second name using the natural language processing algorithm, and comparing the first natural language processing output and the second natural language processing output. The computing device may process the plurality of different merchants to identify the at least one similarity between the first merchant and the second merchant by training, using tagged data indicating a plurality of similar sounds, a machine learning model to detect similarities in word pronunciation, providing, as input to the trained machine learning model, the first name and the second name, and receiving, as output from the trained machine learning model, an indication of a degree of similarity between the first name and the second name. The computing device may process the plurality of different merchants to identify the at least one similarity between the first merchant and the second merchant by determining that one or more first phonetics of the first name are similar to one or more second phonetics of the second name. The computing device may process the plurality of different merchants to identify the at least one similarity between the first merchant and the second merchant by determining that first properties of the first logo are similar to second properties of the second logo. The computing device may determine that first properties of the first logo are similar to second properties of the second logo based on one or more of: colors used in the first logo and the second logo; words used in the first logo and the second logo; or shapes used in the first logo and the second logo. The computing device may process the plurality of different merchants to identify the at least one similarity between the first merchant and the second merchant by determining that the first name and the second name sound similar when spoken in a particular language. The computing device may determine that first properties of the first logo are similar to second properties of the second logo based on determining that a first word associated with the first logo is the same as a second word associated with the second logo.

Corresponding method, apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
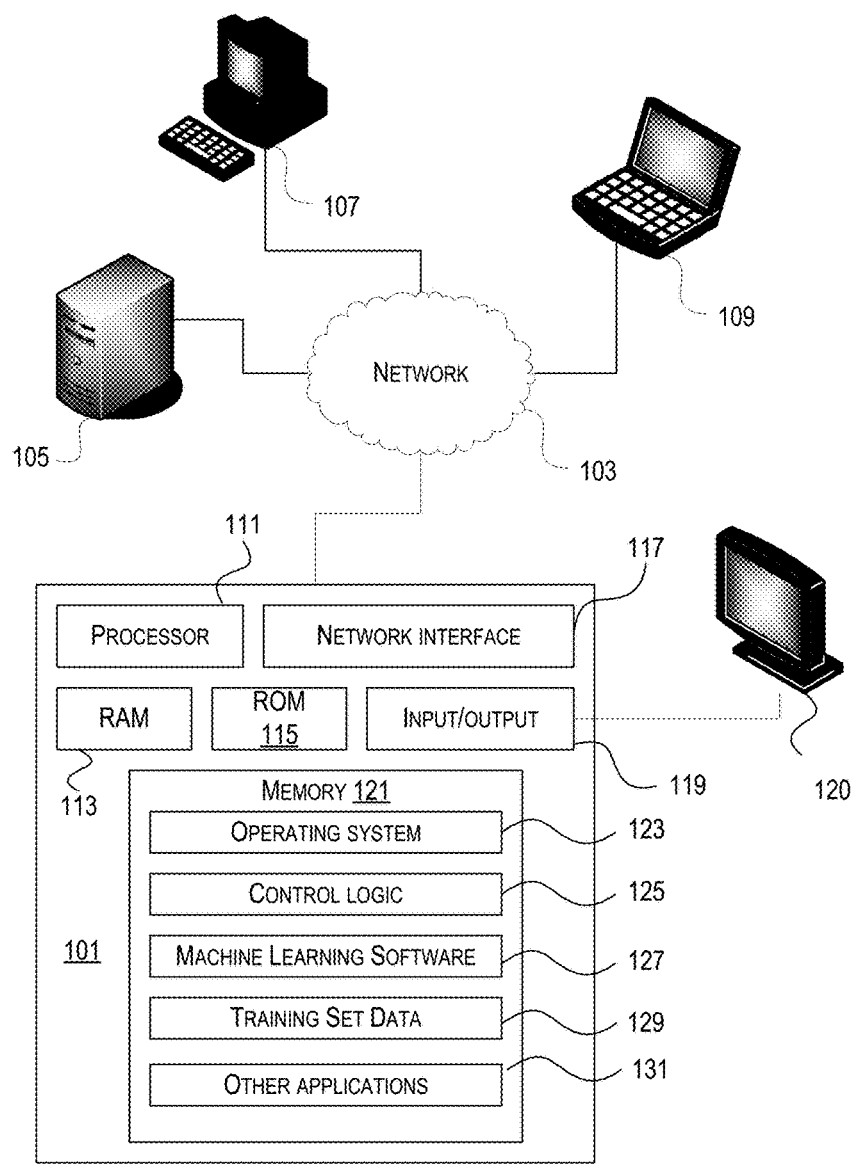
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving authentication questions used during an authentication process. In particular, the process depicted herein may exclude certain merchants from being presented to a user in an authentication question. These merchants may bear certain similarities to one or more true merchants related to the user's transaction history. In this manner, authentication questions might be generated and presented in a manner which does not undesirably confuse users. For example, the aspects described herein would prevent presentation of an authentication question about a first merchant (e.g., "Kurt's Cars") if it sounded confusingly similar to another merchant (e.g., "Curt's Cars"), as this similarity might make it difficult for a user to distinguish between the merchants.

More particularly, some aspects described herein may provide for a computing device that may receive, from a merchant database, indications of a plurality of different merchants. The computing device may process the indications of the plurality of different merchants to identify at least one similarity between a first merchant and a second merchant. The similarity may be related to a first name or a first logo of the first merchant and a second name and a second logo of the second merchant. The computing device may receive, from a user device, an indication of a request for access to an account. The computing device may receive, from a transaction database, transactions data corresponding to the account, and the transactions data may indicate one or more transactions conducted by a user. Based on at least one similarity between the first merchant and the second merchant, the computing device may generate processed transactions data by removing at least one transaction corresponding to the first merchant from a list of merchants to be presented to the user. The computing device may generate, based on the processed transactions data, an authentication question. The computing device may cause presentation, to the user, of the authentication question. The computing device may receive a candidate response to the authentication question; and provide, based on the candidate response, the user device access to the account.

According to some embodiments, the computing device may process the first name using a natural language processing algorithm and receive first natural language processing output. The computing device may process the second name using the natural language processing algorithm; receive second natural language processing output. The computing device may subsequently compare the first natural language processing output and the second natural language processing output.

In many aspects, the computing device may train a machine learning model to detect similarities in word pronunciation using tagged data indicating a plurality of similar sounds. The first name and the second name may be provided as input to the trained machine learning model. The computing device may receive an indication of a degree of similarity between the first name and the second name as output from the trained machine learning model.

In many aspects, the computing device may determine that one or more first phonetics of the first name are similar to one or more second phonetics of the second name. Alternatively, the computing device may determine that first properties of the first logo are similar to second properties of the second logo. The first properties and second properties may include colors, words or shapes used in the first logo and the second logo. Still alternatively, the computing device may determine that the first name and the second name sound similar when spoken in a particular language. The computing device may determine that first properties of the first logo are similar to second properties of the second logo based on determining that a first word associated with the first logo is the same as a second word associated with the second logo.

Aspects described herein improve the functioning of computers by improving the accuracy and security of computer-implemented authentication processes. The steps described herein recite improvements to computer-implemented authentication processes, and in particular improve the accuracy and utility of authentication questions used to provide access to computing resources. This is a problem specific to computer-implemented authentication processes, and the processes described herein could not be performed in the human mind (and/or, e.g., with pen and paper). For example, as will be described in further detail below, the processes described herein rely on the processing of transaction data, the dynamic computer-implemented generation of authentication questions, and the use of various machine learning models.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
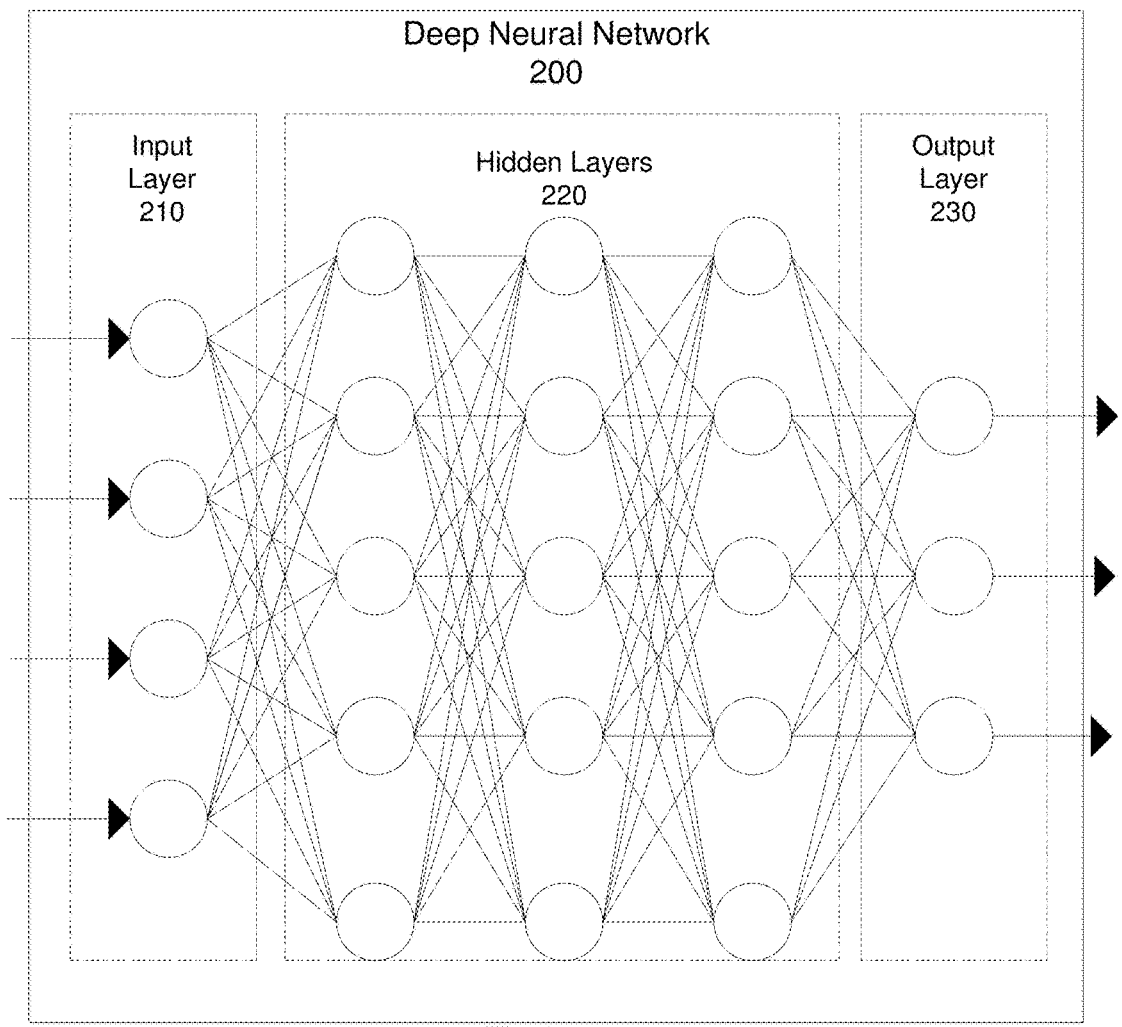
FIG. 2 depicts an example deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
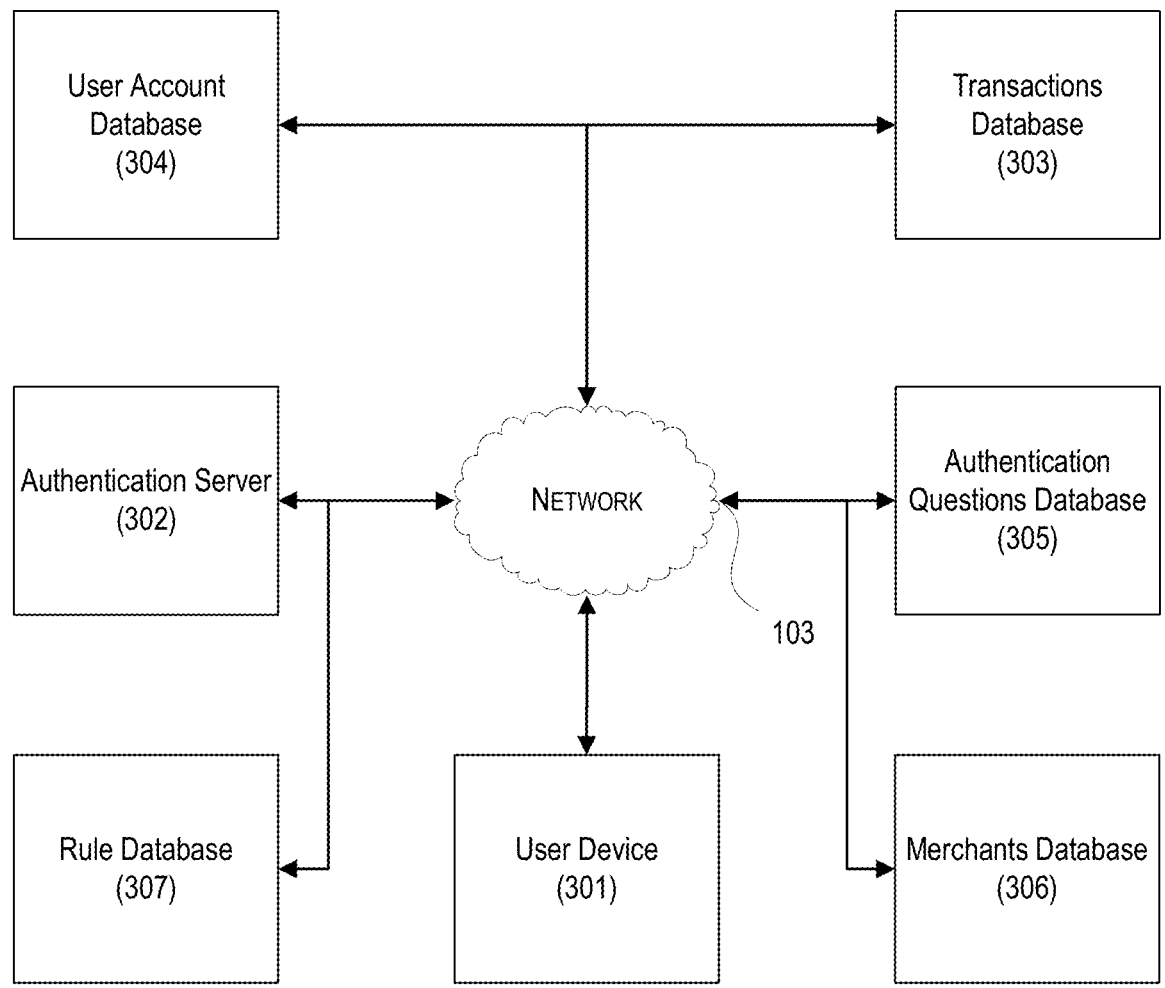
FIG. 3 depicts a system comprising different computing devices that may be used in implementing one or more aspects of the disclosure in accordance with one or more illustrative aspects discussed herein.

FIG. 3 depicts a system for authenticating a user device 301. The user device 301 is shown as connected, via the network 103, to an authentication server 302, a transactions database 303, a user account database 304, an authentication questions database 305, a merchants database 306 and a rule database 307. The network 103 may be the same or similar as the network 103 of FIG. 1. Each of the user device 301, the authentication server 302, the transactions database 303, the user account database 304, the authentication questions database 305, the merchants database 306, and/or the rule database 307 may be one or more computing devices, such as a computing device comprising one or more processors and memory storing instructions that, when executed by the one or more processors, perform one or more steps as described further herein. For example, any of those devices might be the same or similar as the computing devices 101, 105, 107, and 109 of FIG. 1.

As part of an authentication process, the user device 301 might communicate, via the network 103, to access the authentication server 302 to request access (e.g., to a user account). The user device 301 shown here might be a smartphone, laptop, or the like, and the nature of the communications between the two might be via the Internet, a phone call, or the like. For example, the user device 301 might access a website associated with the authentication server 302, and the user device 301 might provide (e.g., over the Internet and by filling out an online form) candidate authentication credentials to that website. The authentication server 302 may then determine whether the authentication credentials are valid. For example, the authentication server 302 might compare the candidate authentication credentials received from the user device 301 with authentication credentials stored by the user account database 304. In the case where the communication is telephonic, the user device 301 need not be a computing device, but might be, e.g., a conventional telephone.

The user account database 304 may store information about one or more user accounts, such as a username, password, demographic data about a user of the account, or the like. For example, as part of creating an account, a user might provide a username, a password, and/or one or more answers to predetermined authentication questions (e.g., "What is the name of your childhood dog?"), and this information might be stored by the user account database 304. The authentication server 302 might use this data to generate authentication questions. The user account database 304 might store demographic data about a user, such as their age, gender, location, occupation, education level, income level, and/or the like.

The transactions database 303 might comprise data relating to one or more transactions conducted by one or more financial accounts associated with a first organization. For example, the transactions database 303 might maintain all or portions of a general ledger for various financial accounts associated with one or more users at a particular financial institution. The data stored by the transactions database 303 may indicate one or more merchants (e.g., where funds were spent), an amount spent (e.g., in one or more currencies), a date and/or time (e.g., when funds were spent), or the like. The data stored by the transactions database 303 might be generated based on one or more transactions conducted by one or more users. For example, a new transaction entry might be stored in the transactions database 303 based on a user purchasing an item at a store online and/or in a physical store. As another example, a new transaction entry might be stored in the transactions database 303 based on a recurring charge (e.g., a subscription fee) being charged to a financial account.

The account data stored by the user account database 304 and the transactions database 303 may, but need not be related. For example, the account data stored by the user account database 304 might correspond to a user account for a bank website, whereas the financial account data stored by the transactions database 303 might be for a variety of financial accounts (e.g., credit cards, checking accounts, savings accounts) managed by the bank. As such, a single user account might provide access to one or more different financial accounts, and the accounts need not be the same. For example, a user account might be identified by a username and/or password combination, whereas a financial account might be identified using a unique number or series of characters.

The authentication questions database 305 may comprise data which enables the authentication server 302 to present authentication questions. An authentication question may be any question presented to one or more users to determine whether the user is authorized to access an account. For example, the question might be related to personal information about the user (e.g., as reflected by data stored in the user account database 304), might be related to past transactions of the user (e.g., as reflected by data stored by the transactions database 303), or the like. The authentication questions database 305 might comprise data for one or more templates which may be used to generate an authentication question based on transaction information (e.g., from the user account database 304 and/or the transactions database 303). The authentication questions database 305 might additionally and/or alternatively comprise one or more static authentication questions, such as an authentication question that is used for a wide variety of users (e.g., "What is your account number?"). An authentication question might correspond to a transaction occurred or not occurred in the past. The authentication questions database 305 might additionally and/or alternatively comprise historical authentication questions. For example, the authentication questions database 305 might comprise code that, when executed, randomly generates an authentication question, then stores that randomly-generated authentication question for use with other users.

The authentication questions stored in the authentication questions database 305 may be associated with varying levels of difficulty. Straightforward answers that should be easily answered by a user (e.g., "What is your mother's maiden name") might be considered easy questions, whereas complicated answers that require a user to remember past transactions (e.g., "How much did you spend on coffee yesterday?") might be considered difficult questions. Similarities in the merchant names or their logos may increase a difficulty of an authentication question. For example, when a user is asked certain authentication questions (e.g., "Have you transacted with Kurt's Cars in the last two weeks?"), and the difficulty level may be enhanced due to the similarities between "Kurt's Cars" and "Curt's Cars," particularly if there is "Curt's Cars," but not "Kurt's Cars" in the user's past transaction history. To promote the user's memorability and reduce confusions, certain authentication questions may be excluded from authentication questions database 305 for certain users. For example, for the user that has conducted transaction with "Curt's Cars" in the past two weeks, the merchant "Kurt's Cars" may be excluded from the authentication questions being presented to the user.

The merchants database 306 might store data relating to one or more merchants, including indications (e.g., names) of merchants, aliases of the merchants, logos of the merchants, and the like. The merchants database 306 might store information about the logos of the merchants, such as colors used in one or more logos corresponding to a merchant, words used in one or more logos corresponding to a merchant, and/or shapes used in one or more logos corresponding to a merchant. For example, the logos of the merchants might be stored as image files. Additionally and/or alternatively, the merchants database 306 might store descriptive data relating to a logo. For example, one logo might be described in data as "round," "red," and "two-color," whereas another logo might be stored in data as "blue," "square," and "four-color." The merchants database 306 might additionally and/or alternatively store information about a name of a merchant. Such a name might be the legal name of a merchant (e.g., "Bob's Tires and Oil LLC"), a nickname for the merchant (e.g., "Bob's Tires"), or the like. The name might be stored in a variety of formats, such as in a phonetic format. Additionally and/or alternatively, merchant names might be stored as associated with different languages. For example, a merchant might have an English nickname (e.g., "Bob's Tires") and a French name (e.g., "Les pneus de Bob").

The data stored by the merchants database 306 might be used to generate authentication questions that comprise both correct answers (e.g., based on data from the transactions database 303 indicating one or more merchants where a user has in fact conducted a transaction) and false answers (e.g., based on data from the merchants database 306, which might be randomly-selected merchants where a user has not conducted a transaction). For example, a computing device may receive from merchants database 306 indications of different merchants. The computing device may process the indications to identify one or more similarities between a first merchant and a second merchant. The computing device may further receive transaction data from transaction database 303 indicating one or more transactions conducted by a user. The computing device may process the transaction data to remove the first merchant from a list of merchants based on the similarities between the first merchant and the second merchant. As such, an authentication question may be generated based on the processed transaction data.

The merchants database 305 may store similarity values corresponding to each pair of merchants in the merchant databases 305. A similarity value may be any subjective or objective representation of the similarity between two merchants, such as the similarity of merchant names, aliases, or logos. For example, a similarity value might be a percentage value (e.g., 80%) or a Boolean value, with "TRUE" indicating similar, and "FALSE" indicating not similar. As yet another example, a similarity value might be a subjective ranking of similarity, such as "Somewhat Similar," "Very Similar," "Exactly the Same," etc. In still another example, a similarity value may be represented in a color scheme, such as "red" representing high similarity, "yellow" representing medium similarity, and "green" representing low similarity.

The rule database 307 may store data corresponding to rules or regulations related to Americans with Disabilities Act (ADA), Section 508 of the Rehabilitation Act, Web Content Accessibility Guidelines (WCAG) 2.0, and etc. Such rules and regulations may stipulate businesses, including financial institutions, must ensure that their services are accessible to people with disabilities. In some examples, a financial institution may adjust similarity thresholds associated with the merchants to increase the users' memorability of the authentication questions and promote accessibility to their accounts. As such, the financial institution may meet or exceed the requirements of the relevant rules and regulations to accommodate the needs of users with disabilities.

Having discussed several examples of computing devices which may be used to implement some aspects as discussed further below, discussion will now turn to a method for excluding certain merchants during authentication.

Figure 4:
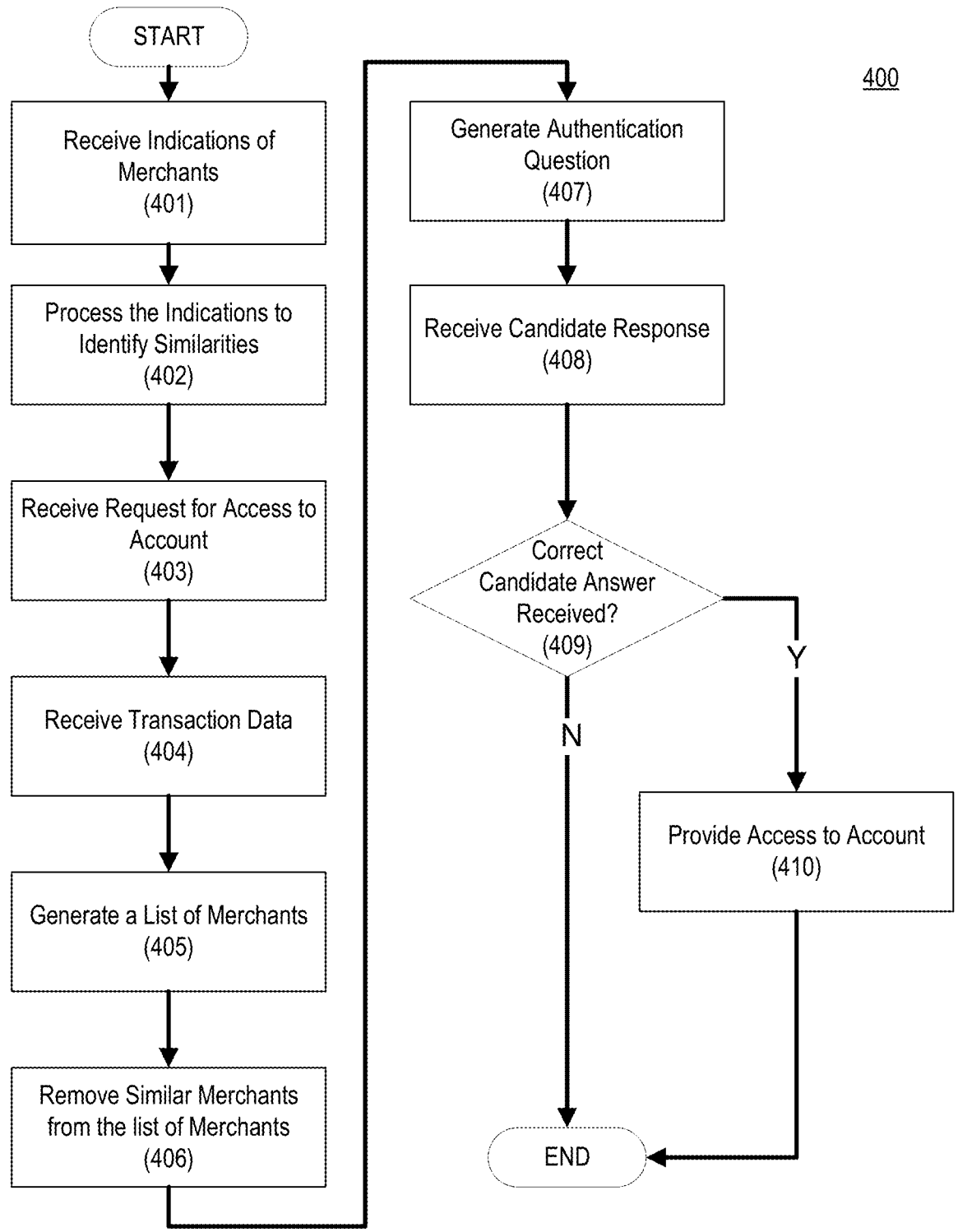
FIG. 4 depicts a flow chart comprising steps which may be performed for excluding merchants based on similarities in merchant logos or names.

FIG. 4 illustrates an example method 400 for excluding merchants based on similarities and presenting authentication questions in accordance with one or more aspects described herein. The method 400 may be implemented by a suitable computing system, as described further herein. For example, the method 400 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 4. The method 400 may be implemented in suitable program instructions, such as in machine learning software 127, and may operate on a suitable training set, such as training set data 129. The method 400 may be implemented by computer-readable media that stores instructions that, when executed, cause performance of all or portions of the method 400. The steps shown in the method 400 are illustrative, and may be re-arranged or otherwise modified as desired.

In step 401, the computing device may determine a plurality of merchants. As part of determining the plurality of merchants, the computing device may determine the names of merchants, the aliases of the merchants, the logos of the merchants, and/or the like. Merchant names may comprise any indication of a merchant, such as a formal name of the merchant (e.g., "Joe's Fish LLC"), a common name of the merchant (e.g., "Joe's Fish"), a slang term associated with the merchant (e.g., "Joe's"), or the like. The merchant names may be retrieved from a database, such as the merchants database 306. For example, the computing device may receive, from a merchants database, a plurality of different merchant names and/or logos. The computing device may additionally and/or alternatively receive information corresponding to logos of one or more merchants. Such logos might be represented in image files, in a descriptive format, or the like. The database (e.g., the merchants database 306) may be populated from a variety of different sources, such as based on transaction records stored by the transactions database 303. The merchants determined in step 401 might correspond to merchants where at least one user has conducted a transaction. Accordingly, determining merchant names may comprise receiving merchant names, aliases, and/or logos corresponding to transactions which have been conducted within a particular time period. For instance, the computing device may receive, from a merchants database, a plurality of different merchant names, aliases, and/or logos corresponding to transactions (e.g., as stored by the transactions database 303) that have been conducted in the last month. In this manner, older (e.g., potentially closed) merchants might not be included in the merchants determined in step 401.

The indications of the logos of the merchants may include properties such as colors, words and shapes of the logos. The words may be in a certain typeface or font that may include variations in size, weight (e.g., bold), slope (e.g., italic), width (e.g., condensed), and/or the like. Every typeface may be a collection of glyphs, each of which may represent an individual letter, number, punctuation mark, or other symbol. The words of the logos or the names of the merchants may be associated with specific spellings or phonetics. For example, certain users may be auditory learners or have vision impairments. The indications of the merchants may include sound, spellings or phonetics to accommodate their disabilities.

In step 402, the computing device may process the indications to identify similarities between merchants. The indications of a plurality of different merchants may be processed to identify at least one similarity between a first merchant and a second merchant. The similarity may be related to a first name or a first logo of the first merchant and a second name and a second logo of the second merchant. For example, the computing device may determine the similarity between a first name "Kurt's Cars" and a second name "Curt's Cars." The computing device may determine the similarity between a first logo for "Kurt's Cars" and a second logo for "Curt's Cars."

A similarity between a first merchant and a second merchant may relate to a similarity in the way the two merchants' names are pronounced. When spoken, two merchant names may sound similar. For example, the names "Curt" and "Kurt" might sound the same, even though they are spelled differently. In such a circumstance, if two names are used for similar merchants, a user might have difficulty distinguishing between the merchants. To determine a similarity in the pronunciation of merchant names, a computing device may examine individual letters in the merchant name. For example, the first merchant (e.g., Kurt's Cars) and the second merchant (e.g., Curt's Cars) may each contain nine letters, of which eight letters are the same. The similarity between the first merchant and the second merchant is 8/9. To determine a similarity in the pronunciation of merchant names, a computing device may examine phonetic spelling in the merchant names to determine the similarity from the phonetic perspective. For example, the computing device may determine the first and second merchants have one sound that is different in their names; the computing device may determine the first and third merchants have two sounds that are different in their names Thus, the first merchant is more similar to the second merchant than the third merchant. In some instances, even the letters may be different in the names, they may still sound similar. For example, letters "r" and "w" may be different, but they may sound similar in some circumstances, particularly form a country that does not have a strong "r" in the vocabulary. A user may have difficulty differentiating the pronunciation of these merchant names. The computing device may apply existing linguistic techniques to match different letters to indicate certain letters (e.g., "r") may be confused with other letter (e.g., "w") sometimes, and determine similarities from the phonetic perspective.

A similarity between a first merchant and a second merchant may relate to a similarity in the logos of the two merchants. A first logo might be similar to a second logo because the two use similar colors, similar shapes, a similar typeface, or the like. As such, a user might be confused by the two logos, which might lead the user to confuse the two merchants. For example, if two logos look nearly identical, a user might improperly assume that the merchants corresponding to those logos are the same, and might be confused when presented an authentication question relating to one of those merchants.

A similarity between a first merchant and a second merchant may relate to a similarity in the goods and/or services provided by the two merchants. For example, if two merchants sell similar products, then a user might be more likely to confuse those two merchants. This is particularly the case when the two merchants might share other similarities, like their name and/or logos.

A similarity between a first merchant and a second merchant may relate to a geographical location of the two merchants. A user may be more likely to confuse two merchants if they are located in a similar geographic region. For example, a user might not confuse "Curt's Tires" and "Kurt's Tires" if they are located in entirely different states, but might readily confuse the two if they are both located in the same city.

The similarity between two merchants might be determined by comparing subjective descriptors of logos of the merchant. For example, data stored in the merchant database 306 might indicate that a logo for a first merchant is "red," "square," and "white text," whereas a logo for a second merchant is "red," "round," and "white text." Based on these indications, the computing device might determine that the two logos are 66.6% similar: after all, two of the three descriptors are similar.

A similarity might be reflected as a similarity value. A similarity value may be any subjective or objective representation of the similarity between two merchants, such as the similarity of merchant names, aliases, or logos. For example, a similarity value might be a percentage value or the like. As another example, a similarity value might be a Boolean value, with "TRUE" indicating similar, and "FALSE" indicating not similar. As yet another example, a similarity value might be a subjective ranking of similarity, such as "Somewhat Similar," "Very Similar," "Exactly the Same," etc.

In a variety of embodiments, the computing device may use a natural language processing algorithm to identify the similarities between merchant names and/or aliases. A natural language processing algorithm might be configured to receive input (e.g., merchant names) and provide output that indicates processing of that input. For example, a natural language processing algorithm might be configured to process a merchant name and provide a phonetic spelling of the name, to provide a version of the name in a different language, or the like. The computing device may receive a first natural language processing output by processing a first name associated with a first merchant (e.g., Kurt's Cars) using a natural language processing algorithm. The computing device may receive a second natural language processing output by processing the second name (e.g., Curt's Cars) using the natural language processing algorithm. The computing device may compare the first natural language processing output and the second natural language processing output to determine whether there may be similarities between the first and second merchants. For example, the computing device may determine there is a 90% similarity based on the names of the merchants (e.g., Kurt's Cars and Curt's Cars). In this manner, the computing device might use natural language processing to identify one or more potential similarities between two merchant names and/or aliases.

In a variety of embodiments, the computing device may use a machine learning model to determine similarities in merchant names A machine learning model (e.g., as implemented via the deep neural network 200 and/or the machine learning software 127) may be trained to identify the similarities, for example, in the merchant names. To train the machine learning model in this manner, the machine learning model may be provided tagged data indicating a plurality of similar sounds, and the machine learning model may be trained to detect similarities in word pronunciation. For example, the machine learning model might be provided a set of one hundred different merchant names, with each merchant name being pre-tagged to indicate, for example, one merchant name sounds similar to another merchant name. The tagged data might also contain other names that might have similar pronunciations. Such tagging might be performed manually by a human, and/or might be provided by preexisting libraries of sound similarities. Then, the computing device may provide, as input to the trained machine learning model, the first name of the first merchant (e.g., Kurt's Cars) and the second name of the second merchant (e.g., Curt's Cars). The computing device may receive an output from the trained machine learning model, and the output may include an indication of a degree of similarity between the first name and the second name. For example, the trained machine learning model may output an indication that there is 95% similarity in the pronunciation of the names of the first merchant and the second merchant. The trained machine learning model may determine that one or more phonetics (e.g., "Kurt's") of the first name (e.g., Kurt's Cars) are similar to one or more phonetics (e.g., "Curt's") of the second name (e.g., Curt's Cars). The machine learning model may determine that the first name of the first merchant and the second name of the second merchant may sound similar when spoken in a particular language (e.g., English or Spanish).

In a variety of embodiments, the computing device may determine the similarities between merchant logos. The merchant logos may include various visual elements. The visual elements may include indications, such as a name, a logo, and a typeface. The visual element logo may comprise colors (e.g., yellow/blue/red), words (e.g., Curt's Cars, Kurt's Cars), and shape (e.g., rectangle, circular, hexagon). The typeface may include Times New Roman, Stencil, Elephant etc. In this way, the visual elements of a first merchant may be compared with the visual elements of a second merchant to determine the similarities between the first merchant (e.g., Curt's Cars) and the second merchant (e.g., Kurt's Cars).

In a variety of embodiments, the computing device may determine that first properties of the first logo are similar to second properties of the second logo. The computing device may use a machine learning model to determine similarities in the logos of the merchants. The machine learning model may be trained using tagged logo data indicating a plurality of logos with similar logos, and the machine learning model may be trained to detect similarities in the visual elements of the logos. For example, the tagged logo data might comprise pairings of a plurality of different logos, and the machine learning model might thereby be trained to identify one or more reasons (e.g., colors, typefaces, shapes) that the paired logos are similar. The tagged logo data may contain colors, words, shapes used in the first logo and the second logo as training data. The words may contain data related to typefaces or fonts of the words in the first logo and the second logo. The first logo of the first merchant (e.g., Kurt's Cars logo) and the second name of the second merchant (e.g., Curt's Cars logo) may be provided as input to the trained machine learning model. The computing device may receive an output from the trained machine learning model, and the output may include an indication of a degree of similarity between the first logo and the second logo. For example, the trained machine learning model may output an indication that there is 75% similarity in the logos of the first merchant and the second merchant. The machine leaning model may determine that a second word (e.g., "Cars") associated with the first logo (e.g., Kurt's Cars) is the same as a second word (e.g., "Cars") associated with the second logo (e.g., Curt's Cars).

In a variety of embodiments, the computing device may process a variety of indications to identify similarities between merchants. The computing device may determine the similarities between merchants based on a combination of factors, such as merchant names, aliases, and/or merchant logos. The computing device may determine the similarities between merchants based on visual representations (e.g., merchant names and merchant logos) and phonetic representations (e.g., spelling, pronunciation, or phonetic emphasis of the merchant names). For example, the machine learning model may determine the first merchant (e.g., Kurt's Cars) and the second merchant (e.g., Curt's Cars)

have an 85% similarity based on the combination of factors. The computing device may use a machine learning model to determine similarities based on the visual representations and the phonetic representations. The machine learning model may be trained using visual and phonetic representations and the trained machine learning model determine similarities in the merchants based on these visual and phonetic representations. The computing device may use a first machine learning model to determine the similarities between merchants based on visual representations and phonetic representations may use a second machine learning model to determine the similarities between merchants based on phonetic representations. The computing device may determine that the first merchant is similar to the second merchant based on a threshold similarity value (e.g., 75%). If the similarity is above this value, there may be a high likelihood of confusions among the user community, particularly for users with disabilities (e.g., users with intellectual or physical disabilities, vision impairments, and or language barrier, or auditory learners).

In a variety of embodiments, the computing device may periodically re-train the machine learning models based on updates on merchant similarities. In some instances, merchant names, aliases, and/or logos might change. For example, some existing merchants may change their logos or go through rebranding processes. As another example, new merchants may appear in the merchant databases. As such, machine learning models might periodically be re-trained to reflect these changes. Additionally and/or alternatively, a new machine learning model might be trained based on detecting a change to a name, alias, and/or logo of a merchant. The merchant similarity data, including the similarity values may be stored in the merchant database 306.

In step 403, the computing device may receive a request for access to an account. For example, the computing device may receive, from a user device, a request for access to an account associated with a user. The request may be associated with access, by a user, to a website, an application, or the like. The request may additionally and/or alternatively be associated with, for example, a user device calling into an Interactive Voice Response (IVR) system or similar telephone response system. For example, the computing device may receive an indication of a request for access to an account responsive to a user accessing a log-in page, calling a specific telephone number, or the like. The request may specifically identify an account via, for example, an account number, a username, or the like. For example, a user might call an IVR system and be identified (e.g., using caller ID) by their telephone number, which might be used to query the user account database 304 for a corresponding account.

In step 404, the computing device may receive transaction data corresponding to the account. The transaction data may be received from, e.g., the transactions database 303. The transaction data might correspond to the account referenced in step 403. For example, the computing device may receive, from a transactions database, transactions data corresponding to the account. The transactions data may indicate one or more transactions conducted by the user. For example, the transactions data may comprise indications of purchases of goods and/or services made by a user. The transactions data might correspond to a period of time, such as a recent period of time (e.g., the last two months, the last four months, or the like). For example, the transaction data may indicate that the user conducted one or more transactions with Curt's Cars in the last week.

In step 405, the computing device may generate a list of merchants. The list of merchants may be generated based on the transaction data. For example, the transaction data may be associated with a first list of merchants (e.g., Curt's Cars) that the user associated with the account has conducted transactions with in the recent period of time. The first list of merchants may be used as candidates for "true merchants" (e.g., based on data from the transactions database 303 indicating one or more merchants where a user has in fact conducted a transaction). The transaction data may be associated with a second list of merchants (e.g., Kurt's Cars) that the user of the account has not conducted transactions with in the recent period of time. The second list of merchants may be used as candidates for "false merchants" (e.g., based on data from the merchants database 306, which might be randomly-selected merchants where a user has not conducted a transaction). The list of merchants may include both the first set of merchants and the second set of merchants.

In step 406, certain merchants may be removed from the list of merchants to be presented to the user based on at least one similarity between the first merchant and the second merchant. For example, based on a similarity between Curt's Cars and Kurt's Cars, there may be a high likelihood that the user may be confused with these two merchants. To reduce potential confusions and promote memorability, the computing device may remove the merchant "Kurt's Cars" from the list of merchants to be presented to the user and in the processed transaction data.

In a variety of embodiment, the computing device may remove the merchants (e.g., Kurt's Cars) proactively for the compliance with ADA. The computing device may retrieve one or more rules from ADA rule database 307. The computing device may remove the merchants to promote accessibility and increase memorability for the user community, particularly for users with disabilities. The computing device may determine which merchants to be removed from the list based on the similarity values and the ADA rules that be applicable to a particular user. The computing device may determine similarity values as part of step 402, then remove merchants based on whether their similarity values satisfy a threshold. For example, if the similarity value is below the 40% threshold, this is considered low similarity; if the similarity value is between 40% to 80%, this is considered intermediate similarity; and if the similarity value is above the 80% threshold, this is considered high similarity. The computing device may recognize a user belongs to a subset of users with visual or auditory issues (e.g., visual impairment, color blindness, or audio processing difficulties), or may be illiterate, or may be a non-English speaker. Such a determination might be made based on information stored in the user account database 304: for example, the user account database 304 might store data indicating that a particular user is colorblind and has audio processing difficulties. The computing device may further retrieve the ADA rules and determine an appropriate similarity thresholds for the users who are colorblind for the compliance with ADA rules on accessibility. For such users, the computing device may apply a lower similarity threshold value and more proactively eliminate certain merchants that may be likely to cause confusions and hinder the users' ability to access their accounts. As such, the similarity thresholds may be tailored to meet the special needs of users with disabilities.

In a variety of embodiments, the similar merchants determined in step [402] may be removed from the set of merchants determined in [405] to generate a candidate merchant list for an authentication questions. For example, the computing device may determine that "Curt's Cars" is a true merchant that the user has transacted with recently, while "Kurt's Cars" is a false merchant that the user has not transacted with recently. The false merchant may be removed from the list of merchants because its resemblance with the true merchant in the user's recent transaction history. If the similarity value for the two merchants has exceeded a threshold value (e.g., 80%), the computing device may remove the false merchant "Kurt's Cars" from the list of the merchants, such that the true merchant "Curt's Cars," not the false merchant "Kurt's Cars" may appear on the candidate merchant list for the user. In another example, due to the high similarity between these two merchants, the computing device may remove both the true merchant "Curt's Cars" and the false merchant "Kurt's Cars" from the list of merchants, such that neither one may appear on the candidate list. However, in another example, if the user has not transacted recently with either merchant "Curt's Cars" or "Kurt's Cars," both of them are false merchants. In this situation, regardless of their similarities, the computing device may not remove them from the merchant list, given that a real user would readily recognize both are false merchants.

In step 407, the computing device may generate an authentication question. The authentication question may be generated based on the candidate merchant list. The authentication question may ask a user, e.g., whether or not they conducted a transaction related to a merchant. The authentication question may be an authentication question relating to a transaction that occurred in the recent period of time. For example, the authenticate question may ask "have you conducted any transaction with Curt's Cars in the last week?" The authentication question may be an authentication question relating to a transaction that not occurred in the recent period of time. For example, the authenticate question may ask "have you conducted any transaction with Hertz in the last week?" It may be desirable for the authentication question to be easily memorized and answered by a legitimate user, but to have the appearance of being a genuine transaction and difficult to guess to an unauthorized user. Given that certain "false merchants" such as "Kurt's Cars" has been removed from the transaction data, the authenticate question may not ask "have you conducted any transaction with Kurt's Cars in the last week?" Due to the similarity with the "true merchants" such as "Curt's Cars", such question may be potentially confusing and may cause the user to fail the authentication process.

An authentication question may have a correct answer and one or more incorrect answers. For example, if the question inquires as to whether or not a user conducted a transaction with a merchant, the answer should be "no," if the user has no corresponding transaction record with the merchant in the transaction history. In turn, in that example, the incorrect answer may be "yes." As another example, the authentication question may ask whether a user recently shopped with a list of merchants (e.g., "Did you shop with the following merchants last week?"), with one answer being a genuine answer (e.g., corresponding to a transaction stored by the transactions database 303) and one or more other answers corresponding to false merchants (e.g., as determined in step 405).

The computing device may present the authentication question. Presenting the authentication question may comprise causing one or more computing devices to display and/or otherwise output the authentication question. For example, the computing device may cause presentation, to the user, of the authentication question. Such presentation might comprise providing the authentication question in a text format (e.g., in text on a website), in an audio format (e.g., over a telephone call), or the like.

In step 408, the computing device may receive a candidate response to the authentication question. A candidate response may be any indication of a response, by a user, to the authentication question presented in step 407. For example, where an authentication question comprises one or more answers, the candidate response might comprise a selection of at least one of the one or more answers. As another example, in the case of a telephone call, the candidate response might comprise an oral response to an authentication question provided using a text-to-speech system over the call.

In step 409, the computing device may determine whether the candidate answer received in step 408 is correct. Determining whether the candidate answer is correct may comprise comparing the answer to the correct answer determined as part of generating the authentication question in step 407. If the candidate answer is correct, the method 400 proceeds to step 410. Otherwise, the method 400 ends.

In step 410, the computing device may provide access to the account. For example, the computing device may provide, based on the candidate response, the user device access to the account. Access to the account might be provided by, e.g., providing a user device access to a protected portion of a website, transmitting confidential data to a user device, allowing a user to request, modify, and/or receive personal data (e.g., from the user account database 304 and/or the transactions database 303), or the like.

Figure 5:
FIG. 5 depicts examples of similar merchant logos, visual elements, and an authentication question.

FIG. 5 depicts merchant logos 501 and 504, visual elements 502 and 506, and an authentication question 507. These elements are representations of various steps in the method 400 depicted in FIG. 4, such as those depicted with respect to steps 401 through 406 of the method 400.

The first merchant logo 501 and the second merchant logo 504 shown in FIG. 5 show example first merchant and second merchant. The first merchant may correspond to a true merchant where transactions have recently been conducted by a user, as reflected by data stored in the transactions database 303. The second merchant may correspond to a false merchant where transactions have not recently been conducted by the user, as reflected by a lack of transaction data for the particular user stored in the transactions database 303 associated with the second merchant.

The visual elements 502 and 506 show various visual elements that have been determined based on processing the merchant logos 501 and 504. In this manner, the visual elements 502 and 506 may be the result of the processing discussed with respect to step 402 of FIG. 4. The visual elements may include various indications: a name 503*a*, a logo 503*b*, and a typeface 503*c* for the first merchant; a name 505*a*, a logo 505*b*, and a typeface 505*c* for the second merchant. The visual element logo 503(*b*) comprise colors (e.g., yellow/blue), words (e.g., Curt's Cars), Shape (e.g., rectangle), and typeface (e.g., Stencil). The visual element logo 505(*b*) comprise colors (e.g., black/blue), words (e.g., Kurt's Cars), shape (e.g., hexagon), and typeface (e.g., Elephant). In this way, the visual elements 502 may be compared with the visual elements 506 to determine the similarities between the first merchant (e.g., Curt's Cars) and the second merchant (e.g., Kurt's Cars).

The second merchant (e.g., Kurt's Cars) may be a false merchant and may be the result of the generating step discussed with respect to step 405 of FIG. 4. The authentication question 507 inquires whether a user transacted with "Curt's Cars" last week. The authentication question 507 might be output corresponding to all or portions of steps 405-407 of FIG. 4. The authentication question asks whether a user has transacted with one of the true merchant 501, such that the correct answer may be "Yes." Note that the authentication question does not ask whether the user transacted with "Kurt's Cars" last week. There may be a high likelihood that "Kurt's Cars" may be confused with "Curt's Cars". For the user that has recently conducted transactions with "Curt's Cars," this false merchant has been removed from the processed transaction data at step 405 of FIG. 4 due to its similarity to a true merchant in the transaction history.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
one or more processors; and
memory storing instructions that, when executed by the one or more processors, cause the computing device to:
receive, from a merchants database, indications of a plurality of different merchants;
process the indications of the plurality of different merchants to identify at least one similarity between a first merchant and a second merchant, wherein the similarity relates to a first name or a first logo of the first merchant and a second name and a second logo of the second merchant;
receive an indication of a request, from a user device, for access to an account;
receive, from a transactions database, transactions data corresponding to the account, wherein the transactions data indicates one or more transactions conducted by a user;
modify, based on the at least one similarity between the first merchant and the second merchant, a candidate merchant list for generating authentication questions by removing the first merchant from the candidate merchant list;
generate, based on the modified candidate merchant list, an authentication question;
receive a candidate response to the authentication question; and
provide, based on the candidate response, the user device access to the account.

2. The computing device of claim 1, wherein the instructions, when executed by the one or more processors, cause the computing device to process the plurality of different merchants to identify the at least one similarity between the first merchant and the second merchant by causing the computing device to:
receive first natural language processing output by processing the first name using a natural language processing algorithm;
receive second natural language processing output by processing the second name using the natural language processing algorithm; and
compare the first natural language processing output and the second natural language processing output.

3. The computing device of claim 1, wherein the instructions, when executed by the one or more processors, cause the computing device to process the plurality of different merchants to identify the at least one similarity between the first merchant and the second merchant by causing the computing device to:
train, using tagged data indicating a plurality of similar sounds, a machine learning model to detect similarities in word pronunciation;
provide, as input to the trained machine learning model, the first name and the second name; and
receive, as output from the trained machine learning model, an indication of a degree of similarity between the first name and the second name.

4. The computing device of claim 1, wherein the instructions, when executed by the one or more processors, cause the computing device to process the plurality of different merchants to identify the at least one similarity between the first merchant and the second merchant by causing the computing device to:
determine that one or more first phonetics of the first name are similar to one or more second phonetics of the second name.

5. The computing device of claim 1, wherein the instructions, when executed by the one or more processors, cause the computing device to process the plurality of different merchants to identify the at least one similarity between the first merchant and the second merchant by causing the computing device to:
determine that first properties of the first logo are similar to second properties of the second logo.

6. The computing device of claim 5, wherein the instructions, when executed by the one or more processors, cause the computing device to determine that the first properties of the first logo are similar to the second properties of the second logo based on one or more of:
colors used in the first logo and the second logo;
words used in the first logo and the second logo; or
shapes used in the first logo and the second logo.

7. The computing device of claim 1, wherein the instructions, when executed by the one or more processors, cause the computing device to process the plurality of different merchants to identify the at least one similarity between the first merchant and the second merchant by causing the computing device to:
determine that the first name and the second name sound similar when spoken in a particular language.

8. The computing device of claim 3, wherein the instructions, when executed by the one or more processors, cause the computing device to determine that first properties of the first logo are similar to second properties of the second logo based on determining that a first word associated with the first logo is the same as a second word associated with the second logo.

9. A method comprising:
receiving, by a computing device and from a merchants database, indications of a plurality of different merchants;
processing, by the computing device, the indications of the plurality of different merchants to identify at least one similarity between a first merchant and a second merchant, wherein the similarity relates to a first name or a first logo of the first merchant and a second name and a second logo of the second merchant;
receiving, by the computing device, an indication of a request, from a user device, for access to an account;
receiving, by the computing device and from a transactions database, transactions data corresponding to the account, wherein the transactions data indicates one or more transactions conducted by a user;

modifying, by the computing device and based on the at least one similarity between the first merchant and the second merchant, a candidate merchant list for generating authentication questions by removing the first merchant from the candidate merchant list;

generating, by the computing device and based on the modified candidate merchant list, an authentication question;

receiving, by the computing device, a candidate response to the authentication question; and providing, based on the candidate response, the user device access to the account.

10. The method of claim 9, wherein processing the plurality of different merchants to identify the at least one similarity between the first merchant and the second merchant comprises:
   receiving first natural language processing output by processing the first name using a natural language processing algorithm;
   receiving second natural language processing output by processing the second name using the natural language processing algorithm; and
   comparing the first natural language processing output and the second natural language processing output.

11. The method of claim 9, wherein processing the plurality of different merchants to identify the at least one similarity between the first merchant and the second merchant comprises:
   training, using tagged data indicating a plurality of similar sounds, a machine learning model to detect similarities in word pronunciation;
   providing, as input to the trained machine learning model, the first name and the second name; and
   receiving, as output from the trained machine learning model, an indication of a degree of similarity between the first name and the second name.

12. The method of claim 9, wherein processing the plurality of different merchants to identify the at least one similarity between the first merchant and the second merchant comprises:
   determining that one or more first phonetics of the first name are similar to one or more second phonetics of the second name.

13. The method of claim 9, wherein processing the plurality of different merchants to identify the at least one similarity between the first merchant and the second merchant comprises:
   determining that first properties of the first logo are similar to second properties of the second logo.

14. The method of claim 13, wherein determining that the first properties of the first logo are similar to the second properties of the second logo is based on one or more of:
   colors used in the first logo and the second logo;
   words used in the first logo and the second logo; or
   shapes used in the first logo and the second logo.

15. The method of claim 9, wherein processing the plurality of different merchants to identify the at least one similarity between the first merchant and the second merchant comprises:
   determining that the first name and the second name sound similar when spoken in a particular language.

16. One or more non-transitory computer-readable media storing instructions that, when executed by one or more processors, cause a computing device to:
   receive, from a merchants database, indications of a plurality of different merchants;
   process the indications of the plurality of different merchants to identify at least one similarity between a first merchant and a second merchant, wherein the similarity relates to a first name or a first logo of the first merchant and a second name and a second logo of the second merchant;
   receive an indication of a request, from a user device, for access to an account;
   receive, from a transactions database, transactions data corresponding to the account, wherein the transactions data indicates one or more transactions conducted by a user;
   modify, based on the at least one similarity between the first merchant and the second merchant, candidate merchant list for generating authentication questions by removing the first merchant from the candidate merchant list;
   generate, based on the modified candidate merchant list, an authentication question;
   receive a candidate response to the authentication question; and
   provide, based on the candidate response, the user device access to the account.

17. The non-transitory computer-readable media of claim 16, wherein the instructions, when executed by the one or more processors, cause the computing device to process the plurality of different merchants to identify the at least one similarity between the first merchant and the second merchant by causing the computing device to:
   receive first natural language processing output by processing the first name using a natural language processing algorithm;
   receive second natural language processing output by processing the second name using the natural language processing algorithm; and
   compare the first natural language processing output and the second natural language processing output.

18. The non-transitory computer-readable media of claim 16, wherein the instructions, when executed by the one or more processors, cause the computing device to process the plurality of different merchants to identify the at least one similarity between the first merchant and the second merchant by causing the computing device to:
   train, using tagged data indicating a plurality of similar sounds, a machine learning model to detect similarities in word pronunciation;
   provide, as input to the trained machine learning model, the first name and the second name; and
   receive, as output from the trained machine learning model, an indication of a degree of similarity between the first name and the second name.

19. The non-transitory computer-readable media of claim 16, wherein the instructions, when executed by the one or more processors, cause the computing device to process the plurality of different merchants to identify the at least one similarity between the first merchant and the second merchant by causing the computing device to:
   determine that one or more first phonetics of the first name are similar to one or more second phonetics of the second name.

20. The non-transitory computer-readable media of claim 16, wherein the instructions, when executed by the one or more processors, cause the computing device to process the plurality of different merchants to identify the at least one similarity between the first merchant and the second merchant by causing the computing device to:

determine that first properties of the first logo are similar to second properties of the second logo.

\* \* \* \* \*